US009629051B2

(12) United States Patent
Wass

(10) Patent No.: US 9,629,051 B2
(45) Date of Patent: Apr. 18, 2017

(54) LOW PRIORITY INDICATION IN EXTENDED SERVICE REQUEST FOR ENHANCED OVERLOAD HANDLING

(75) Inventor: Mikael Wass, Satila (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 61 days.

(21) Appl. No.: 14/008,759

(22) PCT Filed: Mar. 31, 2011

(86) PCT No.: PCT/EP2011/055010
§ 371 (c)(1),
(2), (4) Date: Sep. 30, 2013

(87) PCT Pub. No.: WO2012/130312
PCT Pub. Date: Oct. 4, 2012

(65) Prior Publication Data
US 2014/0016616 A1   Jan. 16, 2014

(51) Int. Cl.
*H04W 4/00*   (2009.01)
*H04W 36/22*   (2009.01)
(Continued)

(52) U.S. Cl.
CPC ........... *H04W 36/22* (2013.01); *H04W 76/02* (2013.01); *H04W 28/16* (2013.01); *H04W 76/027* (2013.01)

(58) Field of Classification Search
CPC ............................ H04W 28/16; H04W 76/02
(Continued)

(56) References Cited

U.S. PATENT DOCUMENTS

| 7,359,321 B1 * | 4/2008 | Sindhu .................... H04L 47/10 370/230 |
| 2011/0002272 A1 * | 1/2011 | Motohashi .............. H04L 47/10 370/328 |
| 2015/0245253 A1 | 8/2015 | Yin et al. |

FOREIGN PATENT DOCUMENTS

| CN | 101605364 A | 12/2009 |
| EP | 1 686 752 B1 * | 10/2004 ............. H04L 29/06 |
| WO | 2010051763 A1 | 5/2010 |

OTHER PUBLICATIONS

3rd Generation Partnership Project; Technical Specification Group Core Network and Terminals; Non-Access-Stratum (NAS) protocol for Evolved Packet System (EPS); Stage 3 (Release 10); 3GPP TS 24.301 V10.1.0 (Dec. 2010).*

(Continued)

*Primary Examiner* — Wei Zhao
*Assistant Examiner* — Abdeltif Ajid
(74) *Attorney, Agent, or Firm* — Rothwell, Figg, Ernst & Manbeck, P.C.

(57) ABSTRACT

There is provided a method for a user entity adapted for interacting with a mobility management node (MMN). The user entity (UE) initiates a request for service. The UE determines that the UE belongs to a low priority class and the UE, in response to determining that the UE belongs to the low priority class, transmits to the MMN an Extended Service Request (ESR) comprising a low priority class indication. The UE responds to a network initiated request for service which step of responding to the network initiated request for service comprises transmitting to the MMN a message that does not comprise a low priority class indication regardless of the fact that the UE belongs to the low priority class, thereby disregarding whether the user entity belongs to the low priority class, wherein the message is one of a Serving Request (SR) and an ESR.

17 Claims, 6 Drawing Sheets

(51) Int. Cl.
*H04W 76/02* (2009.01)
*H04W 28/16* (2009.01)

(58) Field of Classification Search
USPC .......................................................... 370/331
See application file for complete search history.

(56) References Cited

OTHER PUBLICATIONS ( 3GPP TSG CT WG1 Meeting #68 ;C1-104567;Jacksonville (USA), Nov. 15-19, 2010 S2-105495).*
3GPP TS 23.401 V10.2.0 (Dec. 2010) Technical Specification ,3rd Generation Partnership Project; Technical Specification Group Services and System Aspects; General Packet Radio Service (GPRS) enhancements for Evolved Universal Terrestrial Radio Access Network (E-UTRAN) access (Release 10).*
(3rd Generation Partnership Project; Technical Specification Group CoreNetwork and Terminals; Non-Access-Stratum (NAS) protocol for Evolved Packet System (EPS); Stage 3 (Release 10); 3GPP TS 24.301 V10.1.0 (Dec. 2010)).*
((3GPP TS 23.401 V10.2.0 (Dec. 2010) Technical Specification ,3rd Generation Partnership Project; Technical Specification Group Services and System Aspects; General Packet Radio Service (GPRS) enhancements for Evolved Universal Terrestrial Radio Access Network (E-UTRAN) access (Release 10)).*
3GPP, "3rd Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.2.0, Dec. 2010, 276 pages.
3GPP, "3rd Partnership Project; Technical Specification Group Core Network and Terminals; Non-Access-Stratum (NAS) Protocol for Evolved Packet System (EPS); Stage 3 (Release 10)", 3GPP TS 24.301 V10,1.0, Dec. 2010, 305 pages.
3GPP "NAS signalling low priority indicator in the Paging Response message", 3GPP TSG CT WG1, Meeting #70; C1-111501, Feb. 21-25, 2011, Rel-10, 1 page, XP050480830.
Alcatel-Lucent, "NIMTC—MME/SGSN overload control by DL MTC traffic throttling" 3GPP TSG SA WG2 Meeting #79; TD 82-102488, May 10-14, 2010, 4 pages, XP050434634.
Alcatel-Lucent "NIITC distinction of overload versus congestion", 3GPP TSG SA WG2 Meeting #62, S2-105387, Change Request, 23.060 CR 1275, v. 10.1-0, Nov. 15-19, 2010, 4 pages, XP050522792.
Alcatel-Lucent "NIMTC S-GW and P-GW overload controls", 3GPP TSG SA WG2 Meeting #82, S2-105388, Change Request, 23.401 CR 1875, v. 10.1.0, Nov. 15-19, 2010, 2 pages, XP050467821.
Ericsson, et al., "Normative NIMTC text for low priority access", 3GPP TSG-WG2 Meeting #80, S2-104034, Change Request, 23.401 CR 1695, v. 10.0.0, Aug. 30-Sep. 3, 2010, 2 pages XP050459080.
Ericsson, et al., "Mobility management congestion control and back-off timer", 3GPP TSG-CT WG1 Meeting #70, C1-111522, Change Request, 24.301 CR 0962, v. 10,1.0, Feb. 21-25, 2011; 40 pages; XP050480850.
Nokia Siemens Networks, et al. "Low priority indicator CT1", 3 GPP TSG CT WG1, Meeting #68, C1-104567, S2-105495, Nov. 15-19, 2010, 2 pages, XP050470174.
ZTE, "Adding New EMM Cause Value for NIMTC Overload Control", 3GPP TSG-CT WG1 Meeting #68, C1-104567, (was C1-103780), Change Request 24.301 CR 0899, v 10.0.0, Nov. 15-19, 2010, 10 pages, XP050479075.
ZTE, "Enhancements for CN Overload control". 3GPP TSG RAN WG3 #70, Agenda Item 18, R3-103353, Nov. 15-19, 2010, 2 pages; XP050496692.
First Chinese Office Action issued on Jun. 3, 2016 in corresponding Chinese Patent Application No. 201180069684.5 and English translation, 14 pages.
Samsung and ZTE, "Identifier in the request for the (MTC) communications that should be discriminated for the overloaded/congested network," 3GPP TSG SA WG2 Meeting #80, TD S2-103367, Aug. 30-Sep. 3, 2010, 6 pages.
Second Office Action issued in corresponding Chinese Patent application 201180069684.5, dated Jan. 18, 2017, 9 pages, with summary translation.

* cited by examiner

FIG. 2 - CORRESPONDING TO TS23.401 V10.2.1 FIGURE 5.3.4.1-1: UE TRIGGERED SERVICE REQUEST PROCEDURE

FIG. 3 - CORRESPONDING TO TS23.401 V10.2.1 FIGURE 5.3.4.3-1: NETWORK TRIGGERED SERVICE REQUEST PROCEDURE - PRIOR ART

LOW PRIORITY INDICATION IN EXTENDED SERVICE REQUEST FOR ENHANCED OVERLOAD HANDLING

CROSS REFERENCE TO RELATED APPLICATION(S)

This application is a 35 U.S.C. §371 National Phase Entry Application from PCT/EP2011/055010, filed Mar. 31, 2011, the disclosure of which is incorporated by reference.

TECHNICAL FIELD

This invention relates to mobile communication networks and methods for using such networks. More particularly, the invention relates to apparatuses and methods involving use of service request signalling and extended service request signalling.

BACKGROUND

FIG. 1 shows a prior art non-roaming network architecture in which communication for a mobile terminal, or user entity, UE, may be carried through various 3GPP access and network technologies. There is shown a GERAN (GSM EDGE Radio Access Network,~referred to as 2G) access interface (comprising a BSS (Base Station Subsystem not shown)), a UTRAN (UMTS Terrestrial Access Network, ~referred to as 3G) interface (comprising a NodeB base station (not shown)) and an E-UTRAN (referred to as LTE (Long Term Evolution)) interface (comprising an eNodeB base station (not shown)).

On the core network side, the GERAN and the UTRAN access networks both have interfaces to a SGSN (Serving GPRS Support Node). The MME (Mobility Management Entity) is the key control node for the LTE access-network. It is responsible for idle mode UE (User Equipment) tracking and paging procedures including retransmissions. The MME is involved in the bearer activation/deactivation process and is also responsible for choosing the SGW (Serving Gateway) for a UE at the initial attach and at time of intra-LTE handover involving Core Network (CN) node relocation.

Other known nodes shown in FIG. 1—corresponding to TS23.401 V.10.2.1-2011-01—FIG. 4.2.1-1—are HSS (Home Subscriber Server), PCEF/PGW (Packet Data network (PDN) Gateway) and PCRF (Policy Charging and Rules Function), the later nodes having connection to an operator's IP services, IMS (IP Multimedia Subsystem), PSS (Packet Switch Streaming), etc.

Control plane signaling concerning the user entity is transmitted over the S1-MME interface while user plane signaling concerning the user entity is transmitted over the S1-U user plane. Moreover, there are provided known interfaces S3, S10, S11, S4, S6a, S12, S5, Gx, SGi and Rx.

For a user entity having LTE access capabilities at least the following options noted in table 1 exist:

TABLE 1

| attachment | state | PS/CS/paging options |
|---|---|---|
| non-attached | — | — |
| attached | ECM-IDLE | no PS/no CS, page possible |
| attached | ECM-CONNECTED | PS; CS; combined CS and PS |

When a user entity in ECM-IDLE mode needs network service, such as packet switched (PS), circuit switched (CS) or combined CS and PS network service, the Service Request procedure is used according to 3GPP TS 23.410 V10.2.1 (2011-01)-5.3.4.1 and 3GPP TS 24.301 V10.1.0 (2010-12). This procedure is initiated by the user entity, as shown in FIG. 2—corresponding to T823 401 V10.2.1 FIG. 5.3.4.1-1: UE triggered service request procedure. Alternatively, a service request can be requested by the network with a paging message, as shown in FIG. 3—corresponding to TS23.401 V10.2.1 FIG. 5.3.4.3-1: Network triggered service request procedure.

The user entity can request service by transmitting either a Service Request signal or an Extended Service Request signal. The former is used for normal service requests and the latter is mainly used for service requests related to CSFB (Circuit Switched Fall Back).

Therefore, it is provided that a low priority indication may be included in an extended service request NAS (Non-Access Stratum) message, for among others, devices which may have a lower priority. Thereby, the network can chose to discard or reject service requests from user entities which may not need a speedy handling of service. Change requests (CR) to 24.301: "3GPP TSG-CT WG1 Meeting #70, C1-111521, Salt Lake City, Utah (USA). 21-25 Feb. 2011", describes a low priority as an actual information element to the extended service request, and "C1-111521 3GPP TSG-CT WG1 Meeting #69, C1-110095 Ljubljana (Slovenia). 24-28 Jan. 2011" describes an enhancement to the Extended Service Request so it can be used for other services than CSFB (Circuit Switched Fall Back), i.e. PS services.

The implication of the above options is that the network may check for a low priority indicator when receiving a NAS message from the user entity. If a low priority indicator is set, this may be taken into account by the network to decide on further handling of the message.

As mentioned above, if a user entity needs to change state from IDLE to be serviced by the network it shall initiate a service request procedure. The initial message sent to the network may be selected based on the priority of the request. If a user entity request, e.g. by configuration, is associated with a low priority class, the user entity may send an Extended Service Request NAS message with a low priority indicator being set. If the MME receives an Extended Service Request NAS message with a low priority indicator, the request can be treated with lower priority than NAS messages without a low priority indicator in a network overload or congestion situation.

In the future, Machine-to-machine (M2M) devices are expected to outnumber usual handheld devices. These M2M devices are expected to mainly demand a low quality of service (QoS) class or other forms of a low priority. In particular, many M2M devices will not need a low latency. The expected high numbers of such devices may lead to congestion in the network. Therefore, among others, such devices could make use of the extended service request with the low priority indicator being set.

SUMMARY OF THE INVENTION

However, even if such low priority indications are used for user entities, e.g. for M2M devices in a network, it is a problem that in high load situations there will still be a high level of unnecessary signalling. In overload situations, when the network sends a paging it would be followed by a user entity transmitting an Extended Service Request message that will subsequently be discarded by the network. It is noted that the basic Service Request signal known from FIG. 2 cannot be "extended" so as to comprise the above indication, as the timing properties associated with such an "extended" basic service request would exceed the timing requirements defined for the radio layer. It is therefore an object of the invention to enable a more efficient utilization of network resources.

Accordingly, there is provided a method for a user entity adapted for interacting with a mobility management entity node, wherein the user entity is adapted to initiate a mobile initiated service request. SR and being adapted to respond to a network initiated SR corresponding to a paging by said mobility management entity node.

The user entity is at least being adapted for transmitting a SR, inserting a low priority indication in and transmitting an extended service request, ESR, or transmitting an ESR without inserting a low priority indication. The method comprises the steps of if the user entity initiates a mobile initiated SR and if the user entity belongs to a low priority class, the user entity responds to the mobility management entity node by transmitting an ESR comprising a low priority indication,
  if a network initiated SR is responded to, obviating or preventing transmitting an ESR with a low priority indication, disregarding whether the user entity belongs to or does not belong to a low priority class.

According to the invention, there is also provided a user entity, comprising processing means and an interface unit, the user entity being adapted for interacting with a mobility management entity node, such as being paged by said mobility management entity node.

The user entity is adapted to initiate a mobile initiated service request, SR and being adapted to respond to a network initiated SR corresponding to a paging by said mobility management entity node.

The user entity is moreover at least being adapted for transmitting a SR, inserting a low priority indication in and transmitting an extended service request, ESR, or transmitting an ESR without inserting a low priority indication, wherein if the user entity initiates a mobile initiated SR and if the user entity belongs to a low priority class, the user entity responds to the mobility management entity node by transmitting an ESR comprising a low priority indication,
  if a network initiated SR is responded to, obviating or preventing transmitting an ESR with a low priority indication, disregarding whether the user entity belongs to or does not belong to a low priority class.

According to another aspect of the invention there is provided a method for a mobility management entity node being adapted for handling (624), or rejecting/discarding (623) a service request, SR, as well as being adapted for handling or rejecting/discarding an extended service request, ESR. The method comprises the steps of monitoring a load level of the mobility management entity node or the load level in a network in which the mobility management entity node resides and performing one decision of if the load level is below a first threshold—handling at least incoming SR's and ESR's with or without a low priority indication,
  if the load level is larger or equal to the first threshold but lower or equal to a second threshold—rejecting/discarding ESR's with a low priority indication while handling ESR's without a low priority indication and handling SR's.

Further, according to the invention there is also provided a mobility management entity node comprising processing means and an interface unit, the mobility management entity node being adapted for handling, or rejecting/discarding a service request, SR, as well as being adapted for handling or rejecting/discarding an extended service request, ESR.

The mobility management entity node being adapted for monitoring a load level of the mobility management entity node or the load level in a network in which the mobility management entity node resides and performing one decision of if the load level is below a first threshold—handling at least incoming SR's and ESR's with or without a low priority indication,
  if the load level is larger or equal to the first threshold but lower or equal to a second threshold—rejecting/discarding ESR's with a low priority indication while handling ESR's without a low priority indication and handling SR's.

It is observed that in order to support prioritization of requests initiated by a non-low-priority user (e.g., a normal user entity) vs. a low priority user entity, it would be necessary to extend the service request messages from such devices. According to the invention, it is reckoned that the known format for the Service Request message has no available bits to indicate a priority, whereas the known extended Service Request message can be extended so as to comprise a priority indication.

According to the invention, it is further observed that that, if a low priority device (contrary to the invention) would always or predominantly initiate the service request using an Extended Service Request message with a low priority indication—also being the case when the service is initiated by the network via paging—the low priority device would of be subject to a lower priority when such Extended Service Request message is received by the network. However, in a high load situation there would be an unnecessary additional signalling if the network transmits a paging followed by an Extended Service Request message from the user entity that will be discarded by the network. According to the invention, when a Service Request—following a paging—is transmitted by a low priority device, it will be less likely prone to have its request rejected/discarded in the mobility management entity node under overload handling.

Further advantages of the invention will appear from the following detailed description of the invention.

DETAILED DESCRIPTION OF PREFERRED EMBODIMENTS OF THE INVENTION

As explained in connection with the prior art, the "basic" Service Request message cannot—without departing from the standard excerpts mentioned above—be extended with a low priority indicator, as there are no free bits to use in the message. The maximum message length has been set by E-UTRAN to be able to guarantee the high timing requirements on a Service Request. This is due to maximum message length constraints put on NAS by lower protocol layers. The Extended Service Request was introduced for less time critical Service Requests that needed more information included in the message itself, such as CSFB (Circuit Switch Fall Back).

Figure 6:
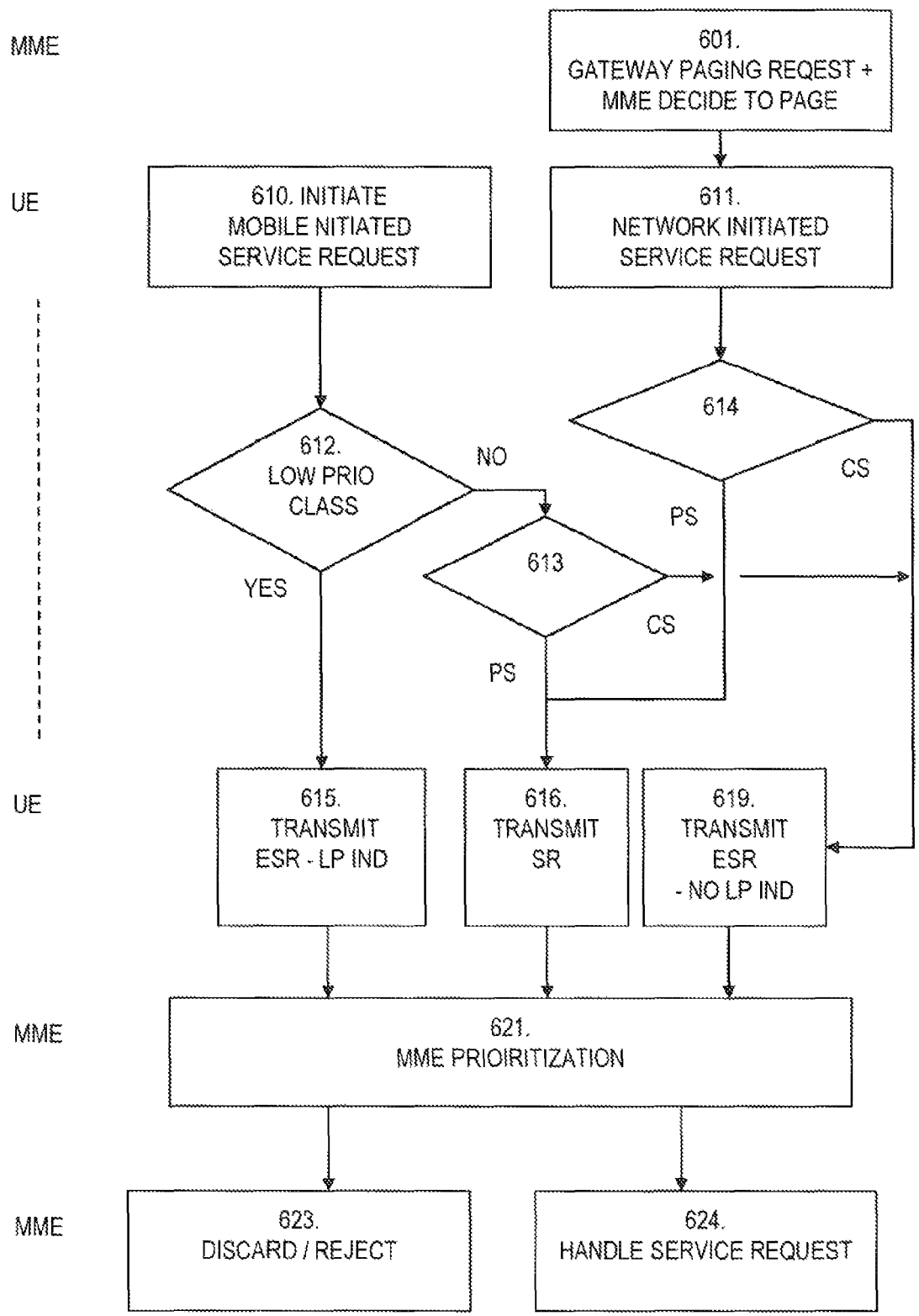
FIG. 6 shows a preferred embodiment of a method for a user entity according to the invention.

Referring to FIG. 6, an embodiment for a method for a user entity shall be explained in the following.

Figure 3:
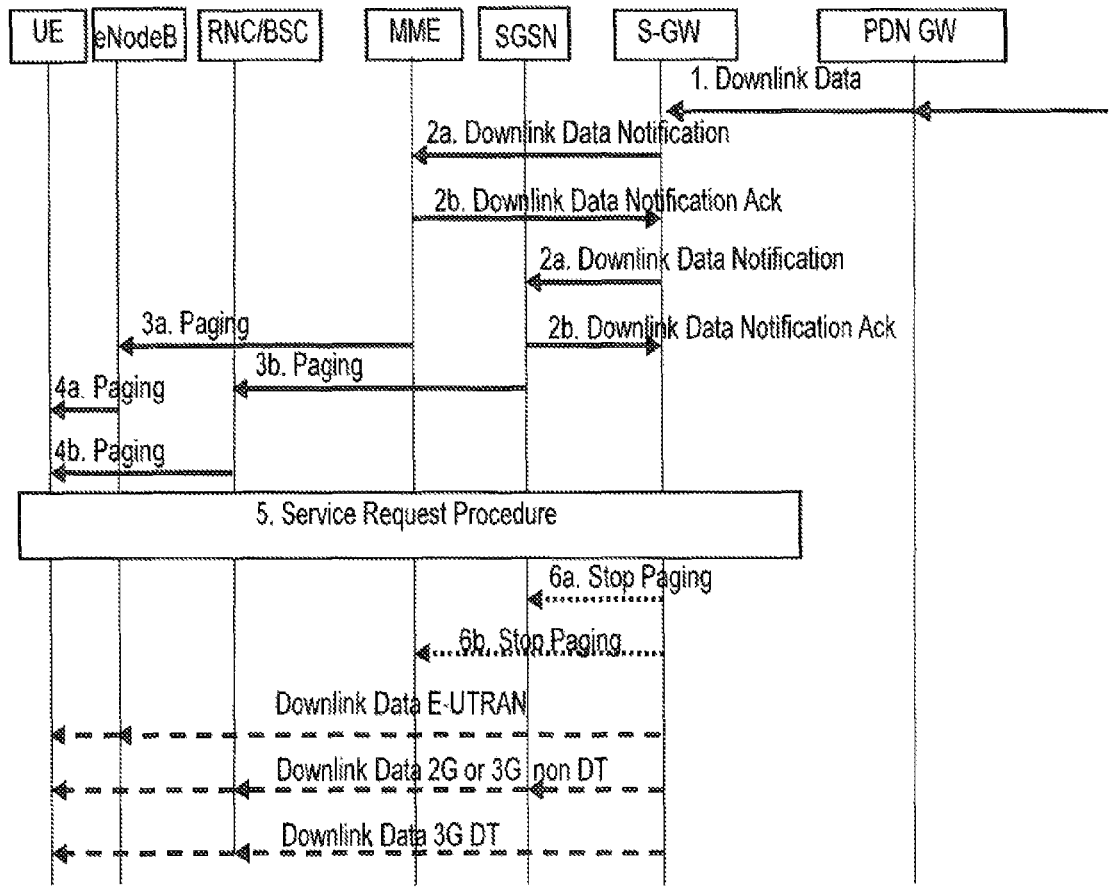
FIG. 3 shows a known network initiated service request procedure.

In step 601, a gateway is transmitting a paging request and the mobility management entity node is subsequently deciding to page a user entity using signalling according to the known procedure shown in FIG. 3, reference 3*a*.

When receiving the page signal (4*a*, 4*b* in FIG. 3), the user entity in question performs it's share (5 in FIG. 3) of a network initiated service request 611.

Figure 1:
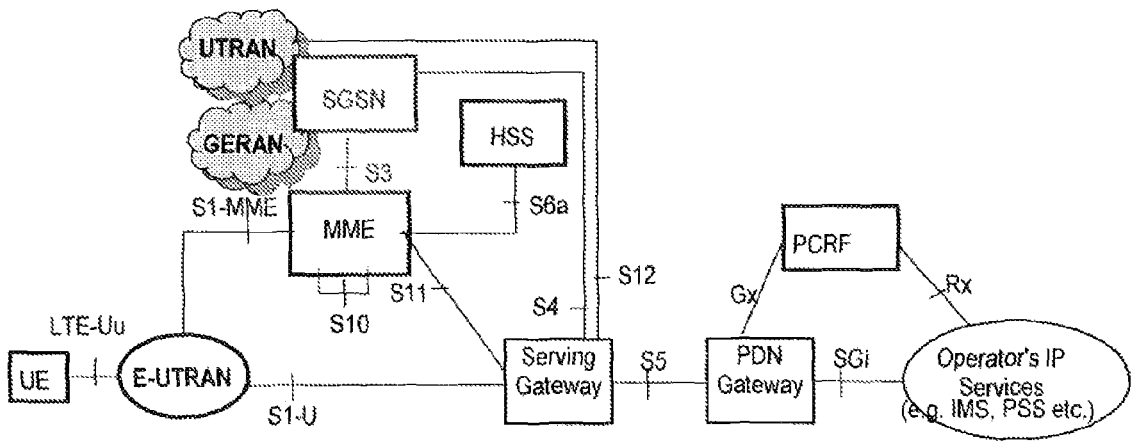
FIG. 1 shows basic elements of a prior art EPC network and signalling.
Figure 2:
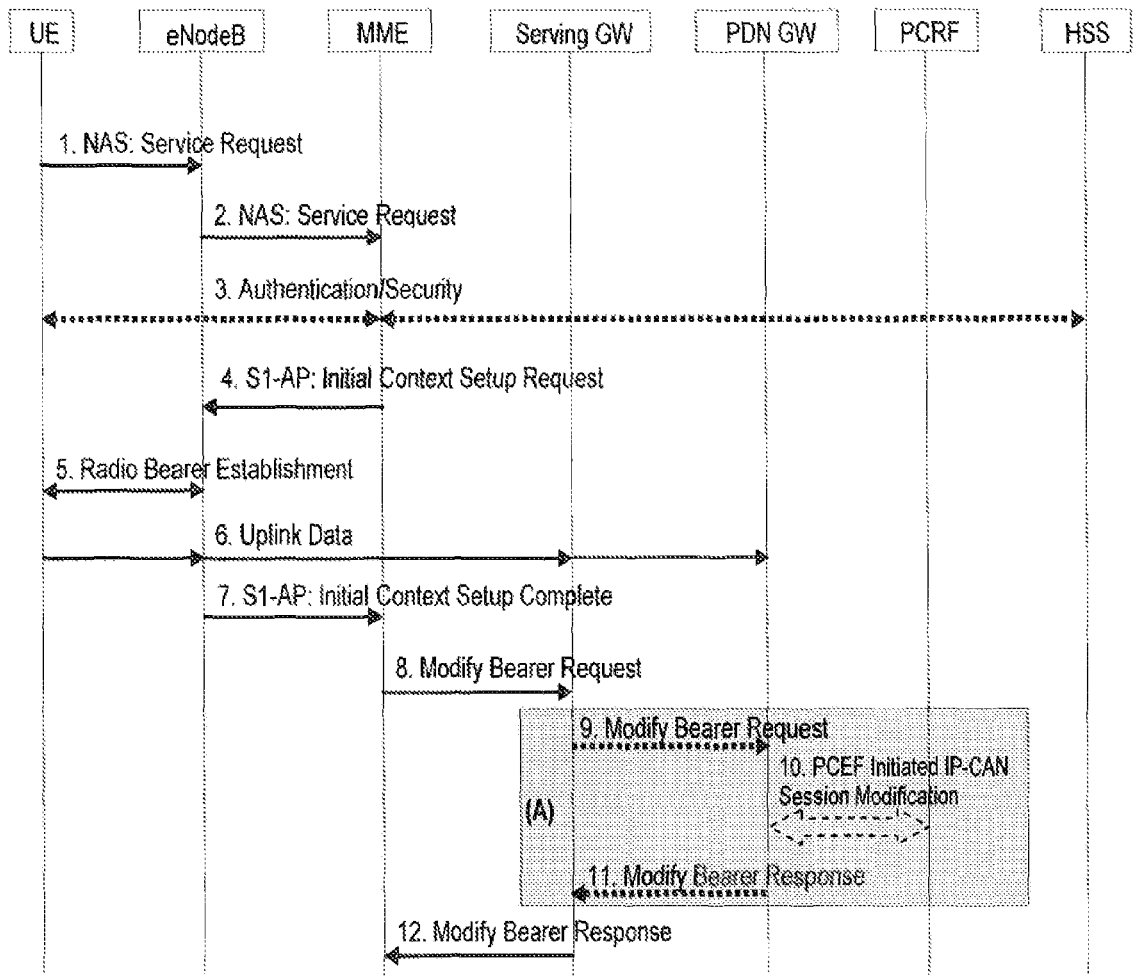
FIG. 2 shows a known user entity triggered service request procedure.

Alternatively, the user entity by its own motion, initiates a mobile initiated service request, 610, as illustrated in the NAS service request 1 of FIG. 2.

Following step 610, if the user entity is configured as a low priority class, or in other respects is commanded to belong to a low priority class, in step 612, the user entity issues an extended service request with a low priority indication, LP_IND, 615.

If, on the other hand, the user entity is not configured as a low priority device, step 612, the user entity method goes to step 613.

According to the invention—if a network initiated SR 611 is responded to, the user entity is obviating or preventing transmitting an ESR 615 with a low priority indication LP_IND, disregarding whether the user entity belongs to or does not belong to a low priority class.

In step 613 it is investigated whether the SR is a request for packet switched, PS, or circuit switched, CS, service. If CS, the method goes to step 619, if PS, the method goes to step 616.

The same investigation is made under step 614, which follows from the network initiated service request 611, in which step 614 it is investigated whether the SR, respectively, is a request for packet switched, PS, or circuit switched, CS, service. If CS, the method goes to step 619, if PS, the method goes to step 616.

Hence, the method further comprises the steps
if a network initiated SR 611 for PS service is responded with, issuing a SR 616, and
if a network initiated SR 611 for CS service is responded with, issuing an ESR 619 with no low priority indication.

Following step 612, if the user entity does not belong to a low priority class, it is seen that the method further comprises, according to step 613, the steps of
if the user entity initiates a mobile initiated SR 610 for PS service, the user entity transmitting a SR 616.
if the user entity initiates a mobile initiated SR 610 for CS service, the user entity transmitting an ESR 619 without a low priority indication LP_IND.

Accordingly, there is provided a method for a user entity UE_I adapted for interacting with a mobility management entity node MME_I, wherein the user entity is adapted to initiate a mobile initiated service request, SR 610 and being adapted to respond to a network initiated SR 611 corresponding to a paging 601 by said mobility management entity node MME_I.

The user entity is at least being adapted for transmitting a SR 616, inserting a low priority indication LP_IND in and transmitting an extended service request, ESR, 615, or transmitting an ESR without inserting a low priority indication 619. The method comprises the steps of
if the user entity initiates a mobile initiated SR 610 and if the user entity belongs to a low priority class, the user entity responds to the mobility management entity node by transmitting an ESR 615 comprising a low priority indication LP_IND, if a network initiated SR 611 is responded to, obviating or preventing transmitting an ESR 615 with a low priority indication LP_IND, disregarding whether the user entity belongs to or does not belong to a low priority class.

According to a further embodiment of the invention, the user entity is an E-UTRAN, evolved UMTS Terrestrial Radio Access Network, user entity and the service requests and extended service requests are Non-Access Stratum (NAS) service requests, It should be understood that the low priority indication does not necessarily indicate a low QoS class, but according to one embodiment, at least a to priority class in NAS signalling terms, i.e. messages which are more likely to be subject to delay/reject/discard on a NAS level. It is alternatively envisioned that the priority class can be changed over time according an order of the network. In such a case, the user entity could perform the investigation under step 612.

Advantageously, the user entity could be pre-configured as belonging to a low priority class before being put into operation. For instance, the user entity may be preconfigured and sold as low priority device.

It should also be understand that step 612 may not necessarily be investigated by the user entity but rather reflect its behaviour according to which priority class it has been designated.

Figure 7:
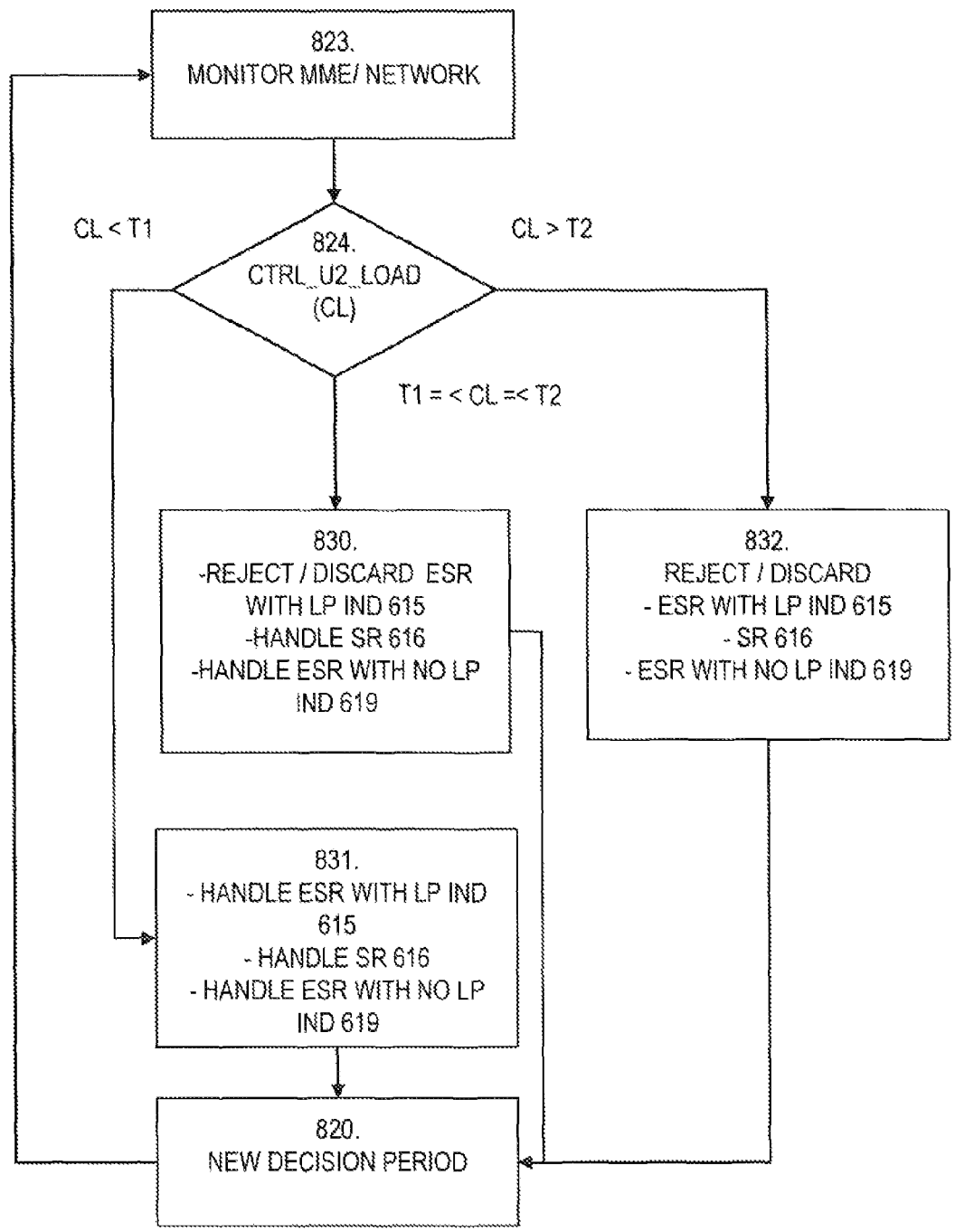
FIG. 7 shows a preferred embodiment of a method for a mobility management node according to the invention.

In FIG. 7 an embodiment for a method for a mobility management entity node according to the invention is shown.

The mobility management entity node, MME_I, performs prioritization, depending on the status in the network such as non-congested, congested or overload situations. For each service request—or each extended service request—of each individual user entity, the mobility management entity node performs decisions 621 so as to discard or reject the service request or the extended service request 623 or to handle the service request or the extended service request 624, that is, accept the latter request.

FIG. 7 shows an initiating 823 of monitoring in the mobility management entity node or the network according to an embodiment of the invention.

Figure 4:
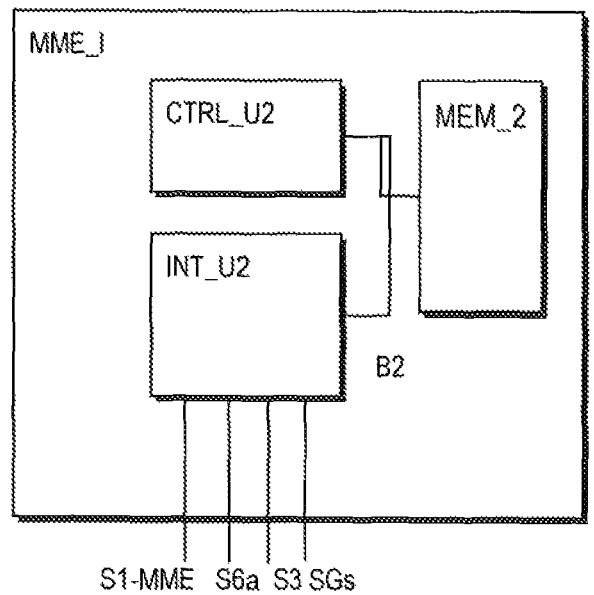
FIG. 4 shows a user entity according to an embodiment of the invention.

In step 824, the load CL in the network, or more specifically in the mobility management entity node, such as the load CTRL_U2_CL in the processor CTRL_U2 in FIG. 4 is within at least the following three ranges with regard to at least a first lower threshold T1 and a second higher threshold T2:

CL<T1 go to step 831
T1<=CL=<T2: go to step 830
T2<=CL: go to step 832

In step 831, the mobility management entity node handles SR's, and ESR's with or without low priority indications.

In step 830, the mobility management entity node rejects/discards ESR with a low priority indication 615, but handle SR's 816 and handle ESR's with no low priority indications, In step 832, the mobility management entity node rejects SR's and ESFR's with or without low priority indications.

The steps 831, 830 and 832 correspond to a decision made by the mobility management entity node. This decision may for instance be valid for a decision period, as illustrated in step 820.

It is understood that more decisions and finer intervals may be provided in further embodiments of the invention.

In other words, there is provided a method for a mobility management entity node being adapted for handling 624, or rejecting/discarding 623 a service request, SR, as well as being adapted for handling 624 or rejecting/discarding 623 an extended service request, ESR. The method comprises the steps of monitoring 823 a load level CL of the mobility management entity node MME_1 or the load level in a network in which the mobility management entity node resides and performing one decision 831, 832, 830 of if the load level CL is below a first threshold T1—handling at least incoming SR's and ESR's, with or without a low priority indication 831, if the load level CL is larger or equal to the first threshold T1 but lower or equal to a second threshold T2—rejecting/discarding 623 ESR's with a low priority indication LP_IND while handling ESR's without a low priority indication and handling SR's 830.

The monitoring 823 of the load level could be implemented by monitoring at least one parameter relating to the load level CL of the management entity node MME_1 or the network.

It is understood that the mobility management entity node can take action directly on the reception of service requests and extended service requests.

It is seen that the mobility management entity node can handle important requests in case of network congestion. If the mobility management entity node receives a request from a gateway node to bring a user entity into service from IDLE mode, the mobility management entity node can decide 601, based on its load and congestion situation, if a paging message shall be sent to the user entity to initiate a service request procedure. If the mobility management entity node evaluates the load situation in combination with the knowledge that this is a low priority request, the paging can be rejected by the mobility management entity node.

If a paging request is received by a user entity configured for low priority or for a low priority service, the user entity shall initiate the service request procedure by sending a Service Request message 616 in case of PS and as an extended service request with no low priority indication 619, in case of CS, to the network. As these messages do not contain any low priority indication, they will be handled with normal priority by the mobility management entity node and is less likely to be discarded or rejected in a high load situation.

This behaviour will imply that user entity requests initiated by the network will not be subject to low priority handling when received by the network and also fulfill timing requirements in the radio layer. Thus, in a moderate load situation, c.f. the "congested" state step 830, the network/mobility management entity can discard/reject low priority requests initiated by user entities 615, e.g. at a signalling flood by low priority devices, and can handle the network initiated requests for service by limiting the paging requests transmitted to the user entities.

Apparatuses

In FIG. 4, a user entity, UE_I is shown comprising a control unit, CTRL_1, an internal memory, MEM_1, an interface unit, INT_1, providing a LTE-Uu interface is shown. An internal bus B1 provides communication between the units and the memory. The control unit and memory constitute processing means which is adapted to carry out the method shown according to FIG. 6. The processing means could alternatively be implemented by a FPGA (Field Programmable Gate Array) (Not shown). The processing means is adapted to transmit and receive signals on a logical level, whereas the interface means provides signals complying with physical requirements.

According to the invention, there is also provided a user entity, UE_1 comprising processing means CTRL_1; MEM_1 and an interface unit INT_1, the user entity UE_I being adapted for interacting with a mobility management entity node MME_I, such as being paged 601 by said mobility management entity node MME_I.

The user entity is adapted to initiate a mobile initiated service request, SR 610 and being adapted to respond to a network initiated SR 611 corresponding to a paging 601 by said mobility management entity node MME_I.

The user entity is moreover at least being adapted far transmitting a SR 616, inserting a low priority indication LP_IND in and transmitting an extended service request, ESR, 615, or transmitting an ESR without inserting a low priority indication 619, wherein if the user entity initiates a mobile initiated SR 610 and if the user entity belongs to a low priority class, the user entity responds to the mobility management entity node by transmitting an ESR 615 comprising a low priority indication LP_IND, if a network initiated SR 611 is responded to, obviating or preventing transmitting an ESR 615 with a low priority indication LP_IND, disregarding whether the user entity belongs to or does not belong to a low priority class.

In other words it is provided that if a network initiated SR 611 for packet switched, PS, service is responded with, the user entity is issuing a SR 616, and if a network initiated SR 611 for circuit switched, CS, service is responded with, the user entity is issuing a ESR 619 with no low priority indication.

It is further provided that if the user entity does not belong to a low priority class if the user entity initiates a mobile initiated SR 610 for a packet switched, PS, service, the user entity is transmitting a SR 616, if the user entity initiates a mobile initiated SR 610 for a circuit switched, CS, service, the user entity is transmitting an ESR 619 without a low priority indication LP_IND.

The user entity could using the method above could be constituted by a M2M device. However, the method could also be implemented in regular handheld devices: For instance, it is envisioned that a low price segment of user entities could be associated a low priority class. Operators could for instance offer pre-configured low priority class user entities for a given market segment.

Figure 5:
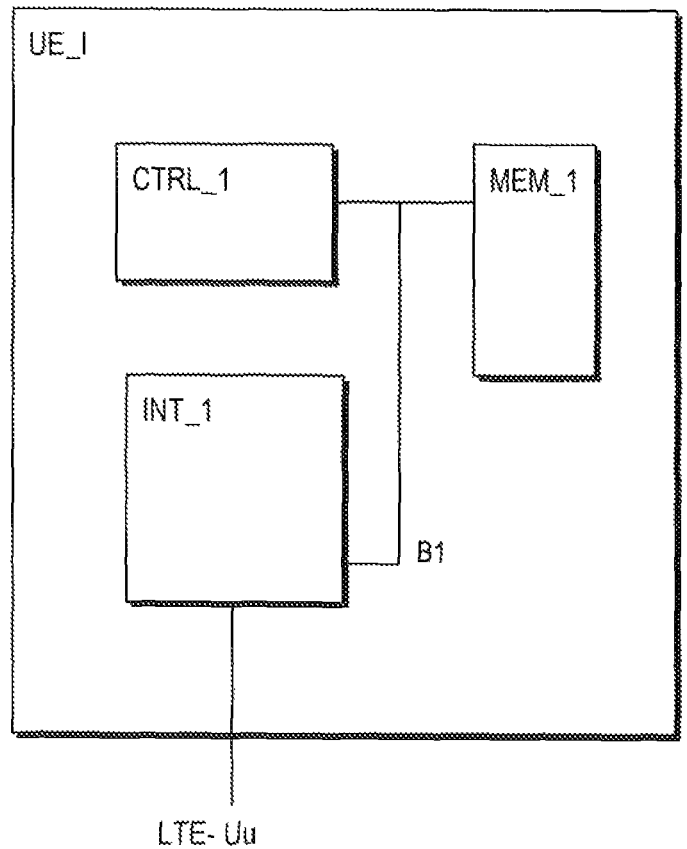
FIG. 5 shows a mobility management entity node according to an embodiment of the invention.

In FIG. 5, a mobility management entity node, MME_I, according to the invention is shown, comprising a control unit, CTRL_U2, comprising one or more processors, a memory MEM_2 and an interface unit INT_U2 providing at least a S1-MME; a S3; a S6a and a SGs interface. An internal bus B2 is also provided. The control unit and memory constitute processing means which is adapted to carry out the method shown according to FIG. 7. The processing means could alternatively be implemented by a FPGA (Field Programmable Gate Array) (Not shown). The processing means is adapted to transmit and receive signals on a logical level, while the interface means transfers signals complying with physical requirements.

Hence, according to the invention there is also provided a mobility management entity node MME_I comprising processing means CTRL_U2; MEM_2 and an interface unit INT_U2, the mobility management entity node being adapted for handling 624, or rejecting/discarding 623 a service request, SR, as well as being adapted for handling 624 or rejecting/discarding 623 an extended service request, ESR.

The mobility management entity node being adapted for monitoring 823 a load level CL of the mobility management entity node MME_1 or the load level in a network in which the mobility management entity node resides and performing one decision 831, 832, 830 of

- if the load level CL is below a first threshold T1—handling at least incoming SR's and ESR's with or without a low priority indication 831,
- if the load level CL is larger or equal to the first threshold T1 but lower or equal to a second threshold T2—rejecting/discarding 623 ESR's with a low priority indication LP_IND while handling ESR's without a low priority indication and handling SR's 830.

In a further embodiment—if the load level CL is above the second threshold T2, the mobility management entity node is rejecting/discarding all ESR's with or without a low priority indication and all SR's 832.

The monitoring 823 of the load level could involve that management entity node is adapted to monitor at least one parameter relating to the load level CL of the management entity node MME_1 or the network.

For instance, the load level could relate to the processor activity in CTRL_U2 in the MME_I. For instance, the first threshold T1 could amount to 70% of the full load and the second threshold T2 could amount to 90% of a full load of the processor capability.

In conclusion the invention caters for that the user entity initiated requests for service with low priority will be subject to lower prioritization handling in the network, Network initiated requests for service will enjoy a normal prioritization handling in the network. Network initiated requests for service will be handled with timing properties fulfilling requirements in the Radio Layer.

The priority of a user entity response to a paging request will be predictable from a network point of view. Responses to paging will always have normal priority, i.e. if the mobility management entity node pages a user entity, the mobility management entity node will "know" that user entity responds without low priority and the response will not be rejected/discarded before any other normal priority messages.

There is no need in the network to correlate a paging request with a received Service Request message to let a low priority response to a paging be treated with different priority from what is indicated.

In a wider sense, the invention provides for that the network can control which low priority user entities should be serviced, by selectively sending paging requests to such user entities, which again will result in a normal priority service request. Since the mobility management entity node is in control of the paging procedure handling, it can handle a Service Request and if the mobility management entity node "wants" the user entity back to Connected mode, the mobility management entity node can page the user entity.

If the mobility management entity node is overloaded, the mobility management entity node can reject the request from the GW directly.

The invention claimed is:

1. A method for a user entity adapted for interacting with a mobility management node (MMN), the method comprising:
   - the user entity (UE) initiating a request for service, which step of initiating the request for service comprises: a) the UE determining that the UE belongs to a low priority class and b) the UE, in response to determining that the UE belongs to the low priority class, transmitting to the MMN an Extended Service Request (ESR) comprising a low priority class indication; and
   - the UE responding to a network initiated request for service, wherein the UE is configured such that:
     - if the network initiated request for service is a request for a circuit switched (CS) service, then the UE transmits to the MMN an ESR that does not comprise a low priority class indication regardless of the fact that the UE belongs to the low priority class, thereby disregarding whether the user entity belongs to the low priority class, and
     - if the network initiated request for service is a request for a packet switched (PS) service, then the UE transmits to the MMN a Service Request (SR).

2. The method according to claim 1, wherein the network initiated request for service is a request for a circuit switched (CS) service.

3. The method according to claim 1, wherein the user entity is an E-UTRAN, evolved UMTS Terrestrial Radio Access Network, user entity and the service requests and extended service requests are Non-Access Stratum (NAS) service requests.

4. The method according to claim 1, wherein the user entity is pre-configured as belonging to a low priority class.

5. A method for a mobility management node (MMN), the method comprising the steps of:
   - the MMN monitoring a load level;
   - the MMN receiving a first Extended Service Request (ESR) comprising a low priority class indication indicating that the user entity that transmitted the ESR belongs to a low priority class;
   - the MMN determining that a first load level value indicative of a first monitored load level is less than a first threshold by comparing the first load level value with the first threshold;
   - the MMN handling the first ESR in response to determining that the first load level value is less than the first threshold;
   - the MMN receiving a second ESR comprising a low priority class indication indicating that the user entity that transmitted the second ESR belongs to a low priority class;
   - the MMN determining that a second load level value indicative of a second monitored load level is greater than the first threshold by comparing the second load level value with the first threshold;
   - the MMN rejecting/discarding the second ESR in response to determining that the second load level value is greater than the first threshold;
   - the MMN receiving a third ESR that does not comprise any low priority class indication;
   - in response to receiving the third ESR that does not comprise any low priority class indication, the MMN determining that a third load level value indicative of a third monitored load level is less than a second threshold by comparing the third load level value with the second threshold, wherein the second threshold is greater than the first threshold; and
the MMN handling the third ESR in response to determining that the third load level value is less than the second threshold.

6. The method according to claim 5, wherein the method further comprises:
the MMN receiving a fourth ESR that does not comprise any low priority class indication;
the MMN determining that a fourth load level value indicative of a fourth monitored load level is greater than the second threshold by comparing the fourth load level value with the second threshold;
the MMN rejecting/discarding the fourth ESR in response to determining that the fourth load level value is greater than the second threshold.

7. The method according to claim 5, wherein the method further comprises:
the MMN receiving from a gateway node a request to bring a user entity into service from an idle mode; and
in response to the request, the MMN determining whether or not to page the user entity, wherein the determination is based on a monitored load level and a priority of the request.

8. The method according to claim 5, wherein the step of monitoring of the load level involves the monitoring of at least one parameter relating to the load level in the mobility management entity node or in the network.

9. A user entity (UE) apparatus for interacting with a mobility management node (MMN), the UE apparatus comprising:
a transmitter;
a receiver for receiving a network initiated request for service; and
a processor, wherein the processor is operable to:
initiate a request for service by a) determining that the UE apparatus belongs to a low priority class and b) in response to determining that the UE apparatus belongs to the low priority class, employing the transmitter to transmit to the MMN an Extended Service Request (ESR) comprising a low priority class indication; and
respond to a received network initiated request for service, wherein
the UE is configured such that:
if the network initiated request for service is a request for a circuit switched (CS) service, then the UE responds to the network initiated request for service by transmitting to the MMN an ESR that does not comprise a low priority class indication regardless of the fact that the UE belongs to the low priority class, thereby disregarding whether the user entity belongs to the low priority class, and
if the network initiated request for service is a request for a packet switched (PS) service, then the UE responds to the network initiated request for service by transmitting to the MMN a Service Request (SR).

10. The UE apparatus of claim 9, wherein the network initiated request for service is a request for a circuit switched (CS) service.

11. The UE apparatus of claim 9, wherein the UE apparatus is an E-UTRAN, evolved UMTS Terrestrial Radio Access Network, user entity and the service requests and extended service requests are Non-Access Stratum (NAS) service requests.

12. The UE apparatus of claim 9, wherein the UE apparatus is pre-configured as belonging to a low priority class.

13. A mobility management node (MMN) apparatus, comprising;
a transmitter;
a receiver; and
a processor, wherein the processor is adapted to:
monitor a load level;
determine that a first load level value indicative of a first monitored load level is less than a first threshold by comparing the first load level value with the first threshold;
handle a first received Extended Service Request (ESR) comprising a low priority class indication indicating that the user entity that transmitted the first ESR belongs to a low priority class in response to determining that the first load level value is less than the first threshold;
determine that a second load level value indicative of a second monitored load level is greater than the first threshold by comparing the second load level value with the first threshold;
reject/discard a second received ESR in response to determining that the second load level value is greater than the first threshold, wherein the second received ESR comprises a low priority class indication indicating that the user entity that transmitted the second ESR belongs to a low priority class;
in response to receiving a third ESR that does not comprise any low priority class indication, determine that a third load level value indicative of a third monitored load level is less than a second threshold by comparing the third load level value with the second threshold, wherein the second threshold is greater than the first threshold; and
handle said third ESR in response to determining that the third load level value is less than the second threshold.

14. The MMN apparatus of claim 13, wherein the processor is further operable to:
determine that a fourth load level value indicative of a fourth monitored load level is greater than the second threshold by comparing the fourth load level value with the second threshold; and
reject/discard a received request for service in response to determining that the fourth load level value is greater than the second threshold, wherein the request for service does not comprise any low priority class indication.

15. The MMN apparatus of claim 13, wherein the processor is further configured such that, in response to the MMN apparatus receiving from a gateway node a request to bring a user entity into service from an idle mode, the processor determines whether or not to page the user entity, wherein the determination is based on a monitored load level and a priority of the request.

16. The MMN apparatus of claim 13, wherein the processor is configured to monitor the load level by monitoring at least one parameter relating to the load level.

17. The method of claim 1, wherein the MMN is configured to process the message transmitted by the UE as if the UE does not belong to the low priority class.

* * * * *